United States Patent
Koganezawa et al.

(10) Patent No.: US 8,438,874 B2
(45) Date of Patent: May 14, 2013

(54) NATURAL GAS LIQUEFACTION PLANT AND MOTIVE POWER SUPPLY EQUIPMENT FOR SAME

(75) Inventors: Tomomi Koganezawa, Tokai (JP); Hidefumi Araki, Hitachi (JP); Shinichi Higuchi, Hitachinaka (JP); Yasuhiro Horiuchi, Hitachinaka (JP); Mutsumi Horitsugi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 55 days.

(21) Appl. No.: 12/438,804

(22) PCT Filed: Jan. 23, 2008

(86) PCT No.: PCT/JP2008/050902
§ 371 (c)(1),
(2), (4) Date: Feb. 25, 2009

(87) PCT Pub. No.: WO2009/093315
PCT Pub. Date: Jul. 30, 2009

(65) Prior Publication Data
US 2010/0275644 A1 Nov. 4, 2010

(51) Int. Cl.
*F02C 3/04* (2006.01)
*F02C 7/12* (2006.01)
*F25J 1/00* (2006.01)

(52) U.S. Cl.
USPC .................. 62/612; 60/805; 60/806; 62/611

(58) Field of Classification Search .............. 60/806, 60/805; 62/611–614, 625, 630, 632, 635
See application file for complete search history.

(56) References Cited

U.S. PATENT DOCUMENTS

| | | | | |
|---|---|---|---|---|
| 5,139,548 A * | 8/1992 | Liu et al. | ......................... | 62/611 |
| 5,689,141 A * | 11/1997 | Kikkawa et al. | ................ | 290/52 |
| 6,994,516 B2 * | 2/2006 | Takahashi et al. | ............ | 415/115 |
| 2002/0174678 A1 | 11/2002 | Wilding et al. | | |
| 2004/0035147 A1 | 2/2004 | Iijima et al. | | |
| 2004/0045274 A1 * | 3/2004 | Uematsu et al. | ........... | 60/39.182 |
| 2004/0129019 A1 | 7/2004 | Jones, Jr. et al. | | |
| 2004/0134196 A1 | 7/2004 | Jones, Jr. et al. | | |
| 2004/0224210 A1 * | 11/2004 | Agnew | ............................. | 429/34 |
| 2006/0150812 A1 * | 7/2006 | Mak et al. | ........................ | 95/199 |

FOREIGN PATENT DOCUMENTS

| | | |
|---|---|---|
| JP | 9-296736 | 11/1997 |
| JP | 2003-515720 | 5/2003 |
| JP | 2004-77075 A | 3/2004 |
| JP | 2005-519153 A | 6/2005 |
| JP | 2006-501403 A | 1/2006 |
| JP | 2006-501433 A | 1/2006 |
| WO | 01/40725 | 6/2001 |

* cited by examiner

*Primary Examiner* — Frantz Jules
*Assistant Examiner* — Henry Crenshaw
(74) *Attorney, Agent, or Firm* — Mattingly & Malur, PC (57) ABSTRACT

Motive power supply equipment for a natural gas liquefaction plant includes gas turbine equipment having a compressor for compressing air, a combustor for generating combustion gases by burning a fuel and the compressed air from the compressor, and a turbine rotated by the combustion gases from the combustor. A low-temperature heat source supply system is provided which, during rated load operation of the gas turbine equipment, supplies carbon dioxide as a cooling medium to the gas turbine equipment in order to cool the gas turbine equipment. The carbon dioxide supplied is generated by separation from the natural gas in the natural gas purification equipment.

9 Claims, 4 Drawing Sheets

NATURAL GAS LIQUEFACTION PLANT AND MOTIVE POWER SUPPLY EQUIPMENT FOR SAME

TECHNICAL FIELD

The present invention relates to natural gas liquefaction plants for liquefying natural gas, and to motive power supply equipment for supplying motive power to such plants.

BACKGROUND ART

For reasons such as the presence of the restriction that the localities of natural gas are usually distant from cities or other industrial facilities, natural gas liquefaction plants for purifying and liquefying the natural gas that was mined from gas fields are commonly self-sufficient at the plant site in terms of the quantitative motive power requirement for plant operation. With this as the background, gas turbine equipment fueled by the mined natural gas is often used as the motive power supply equipment for the natural gas liquefaction plants (refer to Japanese Patent Application Publication JP-A-2003-515720 and other documents).
Patent Document 1: JP-A-2003-515720

DISCLOSURE OF THE INVENTION

Problems to be Solved by the Invention

In gas turbine equipment, a portion of the compressed air which serves as a working fluid is used to cool the turbine blades, combustors, and other parts exposed to high temperatures (hereinafter, these parts are referred to as the high-temperature parts). However, since the localities of natural gas are usually situated in the Middle East, Southeast Asia, and other areas of high air temperatures, the temperature conditions to which the high-temperature parts are exposed tend to become severe in the cooling method using the compressed air. In the meantime, natural gas liquefaction plants require a successive and stable supply of motive power for maintained quality of the natural gas and its increased production, so the gas turbine equipment that is the source of the power is required to be highly reliable, compared with other plants.

One conceivable measure to strengthen the cooling of the high-temperature parts would be by increasing the flow rate of the cooling air. Increasing the flow rate of the cooling air, however, correspondingly reduces combustion air and hence, the output and efficiency of the gas turbine equipment, thus resulting in increased costs of the gas turbine equipment.

An object of the present invention is to provide a natural gas liquefaction plant and motive power supply equipment for the plant, both being capable of cooling high-temperature parts sufficiently without reducing output and efficiency of gas turbine equipment.

Means for Solving the Problems

In order to achieve the above object, the present invention provides motive power supply equipment for a natural gas liquefaction plant, adapted to supply motive power to the natural gas liquefaction plant for liquefying a natural gas from which impurities have been separated in natural gas purification equipment in advance, the motive power supply equipment including: gas turbine equipment having a compressor for compressing air, a combustor for generating combustion gases by burning a fuel and the compressed air from the compressor, and a turbine rotated by the combustion gases from the combustor; and a low-temperature heat source supply system which, during rated load operation of the gas turbine equipment, supplies carbon dioxide as a cooling medium to the gas turbine equipment in order to cool the gas turbine equipment, the carbon dioxide being generated by separation from the natural gas in the natural gas purification equipment.

Effects of the Invention

According to the present invention, since high-temperature parts of gas turbine equipment can be cooled sufficiently with carbon dioxide, reliability of the gas turbine equipment can be improved without decreases in output and efficiency thereof.

DESCRIPTION OF REFERENCE NUMERALS

1 Refrigerant compressor
5 Electric motor
20 Natural gas introduction pipe
21 Main heat exchanger
27 Gas-liquid separator
60 First refrigeration cycle system (Mixed-refrigerants refrigeration cycle system)
61 Second refrigeration cycle system (Propane refrigeration cycle system)
65 Electric motor
70 Natural gas purification equipment
71 Motive power supply equipment
72 Gas turbine equipment
73 Power generator
74 Compressor
75 Combustor
76 Turbine
77 Low-temperature heat source circulation passageway
79 Flow control valve
85 Low-temperature heat source supply system
86 Low-temperature heat source recovery system
90 Absorption tower
91 Intermediate tank
92 Regeneration tower
94 Heat exchanger
97 Gas treatment apparatus
100 Exhaust heat recovery boiler
101 Heat transfer tube
103 High-temperature heat source supply system

BEST MODE FOR CARRYING OUT THE INVENTION

Hereunder, embodiments of the present invention will be described using the accompanying drawings.

Figure 1:
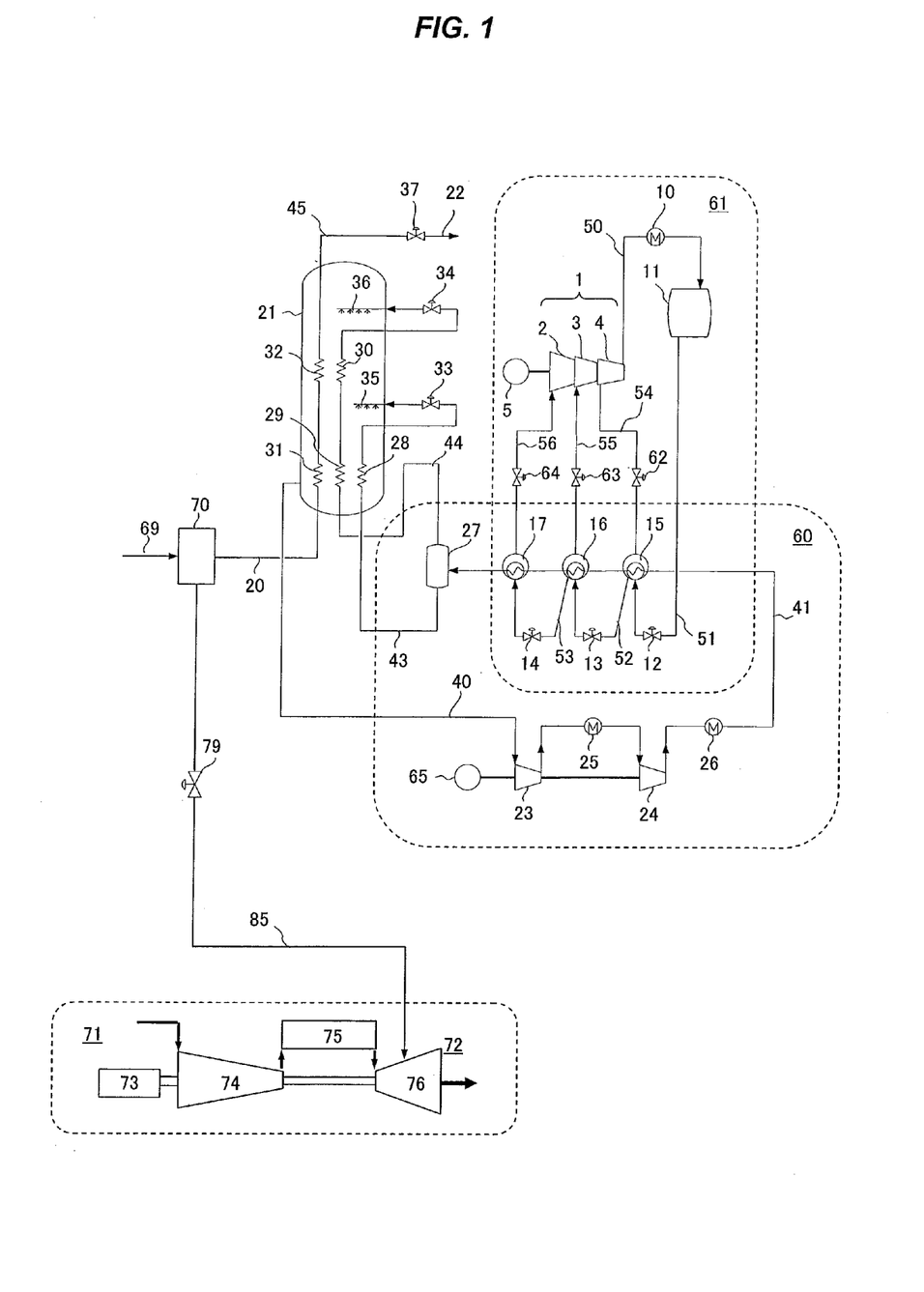
FIG. 1 is a schematic diagram of a natural gas liquefaction plant according to a first embodiment of the present invention.

FIG. 1 is a schematic diagram of a natural gas liquefaction plant according to a first embodiment of the present invention.

The natural gas liquefaction plant shown in FIG. 1 primarily includes natural gas purification equipment 70, a main heat exchanger 21, a first refrigeration cycle system (mixed-refrigerants refrigeration cycle system) 60, a second refrigeration cycle system (propane refrigeration cycle system) 61, motive power supply equipment 71 (for the plant), and a low-temperature heat source supply system 85.

The natural gas purification equipment 70 conducts a pre-process for separating impurities from a raw natural gas 69 that was mined from a gas field. The kinds of impurities contained in the raw natural gas 69 differ according to a particular locality of the natural gas. Examples include acid gases such as carbon dioxide and hydrogen sulfide. Moisture, mercury, and more are also included. The natural gas purification equipment 70 also conducts the step of separating carbon dioxide from the raw natural gas (this step is hereinafter referred to as the $CO_2$ separating step). One example of the $CO_2$ separating step will be described later herein using a figure.

The natural gas purification equipment 70 is connected to gas turbine equipment 72 of the motive power supply equipment 71 via the low-temperature heat source supply system 85 (the gas turbine equipment 72 will be described later herein).

The low-temperature heat source supply system 85 supplies to the gas turbine equipment 72 the carbon dioxide that has been separated from the natural gas during the $CO_2$ separating step by the natural gas purification equipment 70. The carbon dioxide that has been supplied to the gas turbine equipment 72 via the low-temperature heat source supply system 85 is used as a cooling medium to cool high-temperature parts (e.g., turbine rotor blades, turbine stator vanes, a combustor, etc.) that are exposed to a high-temperature environment during rated load operation of the gas turbine equipment 72. Also, the low-temperature heat source supply system 85 has a flow control valve 79, which allows the system 85 to control a flow rate of the carbon dioxide supplied to the gas turbine equipment 72.

The natural gas purification equipment 70 is also connected to a main heat exchanger 21 via a natural gas introduction pipe 20. The natural gas from which the impurities were separated is circulating through the natural gas introduction pipe 20.

The main heat exchanger 21 liquefies the natural gas from which the impurities were separated by the natural gas purification equipment 70, by cooling with a first refrigerant supplied from the first refrigeration cycle system 60.

The natural gas introduction pipe 20 from the natural gas purification equipment 70 is routed into the main heat exchanger 21. The natural gas liquefied circulates through the natural gas introduction pipe 20, which extends across the main heat exchanger 21 and after passing therethrough, serves as a pipe 45. The pipe 20 includes heat transfer passageways 31 and 32 provided inside the main heat exchanger 21, and an expansion valve 37 provided outside the main heat exchanger 21. When the natural gas supplied from the natural gas purification equipment 70 passes through the heat transfer passageways 31, 32, the natural gas is cooled by the first refrigerant sprayed from nozzles 35 and 36 (described later herein), and then further cooled by the expansion valve 37 to become a liquefied natural gas.

In addition, the main heat exchanger 21 is connected via pipes 43 and 44 to the gas-liquid separator 27 into which the first refrigerant is introduced after being cooled by the first refrigeration cycle system 60. The pipe 43 through which a liquid-phase section of the first refrigerant circulates, and the pipe 44 through which a gas-phase section of the first refrigerant circulates are both routed into the main heat exchanger 21.

The pipe 43, after being routed into the main heat exchanger 21, is routed out therefrom temporarily, then rerouted thereinto, and connected to the nozzle 35. The pipe 43 includes a heat transfer passageway 28 provided inside the main heat exchanger 21, and an expansion valve 33 provided outside the main heat exchanger 21. The gas-phase section of the first refrigerant supplied from the gas-liquid separator 27 is cooled during passage through the heat transfer passageway 28 and the expansion valve 33, and then sprayed into the main heat exchanger 21 via the nozzle 35. The first refrigerant thus sprayed from the nozzle 35 cools the natural gas existing in the pipe 20, and the first refrigerant existing in the pipes 43, 44.

The pipe 44, after being routed into the main heat exchanger 21, is also routed out therefrom temporarily, then rerouted thereinto, and connected to the nozzle 36. The pipe 44 includes heat transfer passageways 29 and 30 provided inside the main heat exchanger 21, and an expansion valve 34 provided outside the main heat exchanger 21. The gas-phase section of the first refrigerant supplied from the gas-liquid separator 27 is cooled during passage through the heat transfer passageways 29 and 30 and the expansion valve 34, and then sprayed into the main heat exchanger 21 via the nozzle 36. The first refrigerant thus sprayed from the nozzle 36 cools the natural gas existing in the pipe 20, and the first refrigerant existing in the pipes 43, 44.

The first refrigeration cycle system (mixed-refrigerants refrigeration cycle system) 60 compresses and cools the first refrigerant supplied to the main heat exchanger 21. The first refrigeration cycle system 60 includes a low-pressure refrigerant compressor 23 for compressing the first refrigerant that the main heat exchanger 21 has used to cool the natural gas, an intermediate cooler 25 for cooling the first refrigerant that the low-pressure refrigerant compressor 23 has compressed, a high-pressure refrigerant compressor 24 for compressing the first refrigerant that the intermediate cooler 25 has cooled, an after-cooler 26 for cooling the first refrigerant that the high-pressure refrigerant compressor 24 has compressed, and an electric motor 65 for driving the low-pressure refrigerant compressor 23 and the high-pressure refrigerant compressor 24 by using electric power supplied from the motive power supply equipment 71 via a power line (not shown). A working fluid (first refrigerant) of the first refrigeration cycle system 60 in the present embodiment is a multi-component refrigerant (MCR) with methane, ethane, and propane, as its chief components.

The low-pressure refrigerant compressor 23 is connected at an entrance thereof to a pipe 40 connected to the main heat exchanger 21, and the after-cooler 26 is connected at an exit thereof to a pipe 41. The pipe 41 is connected to the gas-liquid separator 27 after being passed through a cooler group (coolers 15, 16, and 17) of the second refrigeration cycle system 61, at a downstream side of the after-cooler 26.

The gas-liquid separator 27 for gas-liquid separation of the first refrigerant supplied via the pipe 41 is connected to an exit of the first refrigeration cycle system 60 (i.e., an exit of the third cooler 17) via the pipe 41. The pipe 43 that supplies the liquid-phase section of the first refrigerant to the main heat exchanger 21, and the pipe 44 that supplies the gas-phase section of the first refrigerant to the main heat exchanger 21 are connected to the gas-liquid separator 27.

The second refrigeration cycle system (propane refrigeration cycle system) 61 constructed to compress and cool a second refrigerant to cool the first refrigerant supplied to the main heat exchanger 21 uses the second refrigerant to cool the first refrigerant supplied from the first refrigeration cycle system 60. The second refrigeration cycle system 61 includes a refrigerant compressor 1, an electric motor 5, a condenser 10, and a liquid receiver 11, in addition to the first cooler 15, the second cooler 16, and the third cooler 17. A working fluid (second refrigerant) of the second refrigeration cycle system 61 in the present embodiment is propane.

The refrigerant compressor 1 is for compressing the second refrigerant, and is driven by the electric motor 5 coupled to a driving shaft. The refrigerant compressor 1 in the present embodiment is of a tri-stage construction with a high-pressure compressor 4, a middle-pressure compressor 3, and a low-pressure compressor 2. The high-pressure compressor 4 is connected to the cooler 15 via a pipe 54, the middle-pressure compressor 3 to the cooler 16 via a pipe 55, and the low-pressure compressor 2 to the cooler 17 via a pipe 56. A flow control valve 62 is disposed in the pipe 54, a flow control valve 63 in the pipe 55, and a flow control valve 64 in the pipe 56. The flow control valves 62, 63, and 64 control suction flow rates into the compressors 4, 3, and 2, respectively, according to a particular operating state of the refrigerant compressor 1. Electric power for the electric motor 5 is supplied from the motive power supply equipment 71 via a power line (not shown).

The condenser 10 is connected to an exit of the refrigerant compressor 1 via a pipe 50, and uses atmospheric air or seawater or the like to cool and condense the second refrigerant that the refrigerant compressor 1 has compressed.

The liquid receiver 11 is connected to an exit of the condenser 10 and accepts the second refrigerant condensed by the condenser 10. The second refrigerant is stored in condensed and liquefied form in the liquid receiver 11.

The first cooler 15 is connected to an exit of the liquid receiver 11 via a pipe 51, and accepts the second refrigerant that has been reduced in temperature by expanding under reduced pressure via an expansion valve 12 in the pipe 51. The second cooler 16 is connected to the first cooler 15 via a pipe 52, and accepts the second refrigerant that has been further reduced in temperature via an expansion valve 13 in the pipe 52. The third cooler 17 is connected to the second cooler 16 via a pipe 53, and accepts the second refrigerant that has been even further reduced in temperature via an expansion valve 14 in the pipe 53.

The pipe 41 through which the first refrigerant (multi-component refrigerant) circulates is disposed inside the first cooler 15, the second cooler 16, and the third cooler 17 each. The second refrigerant (propane) that the coolers 15, 16, 17 have accepted evaporates by depriving the first refrigerant of heat during the circulation of this latter refrigerant through the pipe 41, and cools the first refrigerant stepwise. Thus, the first refrigerant is cooled to, for example, near −35° C. at a point of time of passing through the third cooler 17. In addition, the coolers 15, 16, and 17 are connected to the compressors 4, 3, and 2, respectively, and the gas-phase second refrigerant supplied from the coolers 15, 16, and 17 to the compressors 4, 3, and 2 serves as an intermediate cooling medium for the second refrigerant in the compressor 1.

The motive power supply equipment 71 is for supplying motive power to the natural gas liquefaction plant, and includes the gas turbine equipment 72. The gas turbine equipment 72 includes a compressor 74 that compresses air, a combustor 75 that generates combustion gases by burning a fuel and the compressed air from the compressor 74, a turbine 76 rotated by the combustion gases from the combustor 75, and a power generator 73 driven by the turbine 76. Electric power that the generator 73 has generated is supplied to the electric motor 5, the electric motor 65, and more, via a power line (not shown), and used as motive power for the plant. Carbon dioxide from the natural gas purification equipment 70 is supplied via the low-temperature heat source supply system 85 during operation of the gas turbine equipment 72.

While one set of gas turbine equipment 72 only is shown for brevity in the present embodiment, a plurality of sets of gas turbine equipment 72 may be provided according to the motive power that the plant requires. Additionally, a configuration in which the compressors 23, 24 of the first refrigeration cycle system 60 and the refrigerant compressor 1 of the second refrigeration cycle system 61 are connected directly to the turbine 76 of the gas turbine equipment 72 may be used to supply the motive power to the natural gas liquefaction plant. However, when, as described above, electric power is generated by the motive power supply equipment 71 as the motive power to be supplied to the plant, the following advantageous effects can be obtained.

Since natural gas liquefaction plants require a successive and stable supply of motive power for maintained quality of the natural gas and its increased production, the motive power supply equipment that is the source of the power is required to be highly reliable, compared with other plants. The localities of natural gas where the natural gas liquefaction plants are constructed are commonly distant from cities having a properly established electric-power supply network, so it may become difficult to check the gas turbine equipment and/or to obtain motive power in case of trouble. In these cases, if a plurality of sets of gas turbine equipment are used to generate electric power as discussed above, even after part of the gas turbine equipment has stopped operating and a power loss has occurred, the other gas turbine equipment in normal operation can compensate for the power loss. Compared with the driving of the refrigerant compressor 1 and the like by direct connection to the turbine, therefore, such an equipment configuration improves reliability of the motive power supply equipment.

Figure 2:
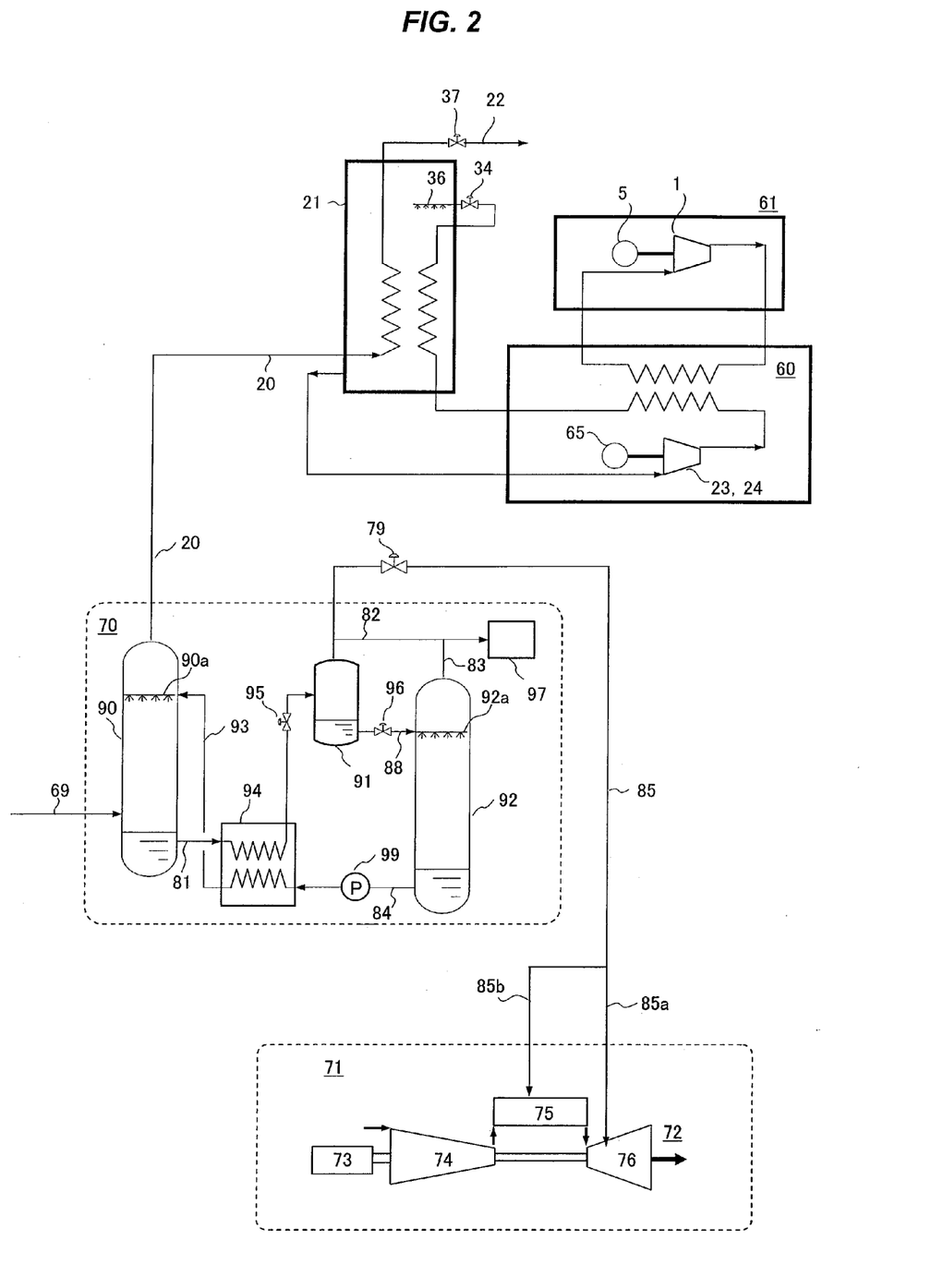
FIG. 2 is a diagram that shows details of natural gas purification equipment 70 and motive power supply equipment 71 shown in the schematic diagram of the natural gas liquefaction plant according to the first embodiment of the present invention.

FIG. 2 is a diagram that shows details of the natural gas purification equipment 70 and motive power supply equipment 71 shown in FIG. 1. The main heat exchanger 21, the first refrigeration cycle system 60, and the second refrigeration cycle system 61 are shown in simplified form in FIG. 2. The same sections as in FIG. 1 are each assigned the same reference number or symbol, and description of these sections is omitted.

The natural gas purification equipment 70 in FIG. 2 includes an absorption tower 90, a heat exchanger 94, an intermediate tank 91, a regeneration tower 92, and a gas treatment apparatus 97.

The absorption tower 90 absorbs acid gases including the carbon dioxide contained in the raw natural gas 69, by bringing an acid-gas absorbing, high-pressure, low-temperature liquid (e.g., aminic solution) into contact with the raw natural gas 69. The absorption tower 90 has a nozzle 90a for spraying the absorbing liquid. The natural gas introduction pipe 20 is connected to an upper section of the absorption tower 90, and a pipe 81 is connected at one end thereof to a lower section of the absorption tower 90. The pipe 81 is connected at the other end thereof to the intermediate tank 91 via the heat exchanger 94, and includes an expansion valve 95 provided at a downstream side of the heat exchanger 94.

The heat exchanger 94 is for exchanging heat between the absorbing liquid that has absorbed the acid gases in the absorption tower 90, and the absorbing liquid that has released the acid gases in the regeneration tower 92, and is provided between the absorption tower 90 and the intermediate tank 91 and between the regeneration tower 92 and the absorption tower 90.

The intermediate tank 91 is for separating a portion of the carbon dioxide contained in the absorbing liquid, and an internal temperature and pressure of the intermediate tank 91 are set so that the carbon dioxide can be extracted from the absorbing liquid. The low-temperature heat source supply system 85 through which the carbon dioxide that has been separated in the intermediate tank 91 circulates is connected to an upper section of the intermediate tank 91, and a pipe 88 through which the absorbing liquid that has released a portion of the carbon dioxide in the intermediate tank 91 circulates is connected at one end of the pipe 88 to a lower section of the intermediate tank 91.

Between the intermediate tank 91 and flow control valve 79 in the low-temperature heat source supply system 85 is connected a pipe 82, which is also connected to the gas treatment apparatus 97 in order to supply to the gas treatment apparatus 97 a portion of the carbon dioxide sent from the intermediate tank 91. The gas treatment apparatus 97 treats the acid gases that have been separated from the raw natural gas 69, and except for the carbon dioxide supplied to the gas turbine equipment 72, all acid gases are recovered by the gas treatment apparatus 97. Also, the pipe 88 is connected at the other end thereof to a nozzle 92a provided in the regeneration tower 92, and has an expansion valve 96 on a route leading to the regeneration tower 92.

The regeneration tower 92 is for separating the acid gases contained in the absorbing liquid, and an internal temperature and pressure of the regeneration tower 92 are set so that the acid gases can be extracted from the absorbing liquid. A pipe 83 through which the acid gases that have been separated in the regeneration tower 92 circulate is connected at one end of the pipe 83 to an upper section of the regeneration tower 92, and a pipe 84 through which the absorbing liquid that has released the acid gases in the regeneration tower 92 circulates is connected at one end of the pipe 84 to a lower section of the regeneration tower 92.

The pipe 83 is connected at the other end thereof to the pipe 82 in order to supply to the gas treatment apparatus 97 the acid gases separated in the regeneration tower 92. The pipe 84 is also connected at the other end thereof to the nozzle 90a of the absorption tower 90 via the heat exchanger 94 in order to supply to the absorption tower 90 the absorbing liquid existing after regeneration. A pump 99 for boosting the absorbing liquid is provided in the pipe 84.

In FIG. 2, the low-temperature heat source supply system 85 is bifurcated into pipes 85a and 85b at a downstream side of the flow control valve 79. The pipe 85a supplies carbon dioxide to the turbine 76, and the pipe 85b supplies carbon dioxide to the combustor 75.

An arrangement for cooling the rotor blades and/or stator vanes of the turbine 76 with the carbon dioxide from the pipe 85a can be implemented by, for example, employing either an open-circuit cooling method in which the pipe 85a is to be connected to an existing circulation passageway for compressed air (cooling air) and the compressed air is mixed with the carbon dioxide, or a closed-circuit cooling method in which an independent circulation passageway is to be provided for the carbon dioxide. The latter is preferable, in view of the fact that the cooling air can be utilized as combustion air according to the amount of cooling with the carbon dioxide. An arrangement for cooling the combustor 75 with the carbon dioxide from the pipe 85b can be implemented by, for example, providing a circulation passageway for the carbon dioxide, at an outer surface of the combustor liner.

Heat exchange between a high-temperature member and carbon dioxide can be realized by, for example, providing such a circulation passageway that shrouds the high-temperature member, and heat-exchanging the carbon dioxide and the high-temperature member directly, or by, for example, mounting in the high-temperature member a circulation passageway through which the carbon dioxide is to be circulated, and heat-exchanging the carbon dioxide and the high-temperature member indirectly. In addition, while the cooling of the turbine 76 and that of the combustor 75 have been described above, carbon dioxide can, of course, be used to cool other high-temperature parts by, for example, branching an existing pipe from the low-temperature heat source supply system 85 separately.

Next, operation of the natural gas liquefaction plant according to the first embodiment of the present invention will be described.

In the natural gas liquefaction plant constructed as described above, the raw natural gas 69 that has been introduced into the absorption tower 90 comes into contact with the absorbing liquid, so that the acid gases in carbon dioxide and the like are absorbed. The natural gas from which the acid gases have been separated by the absorbing liquid is supplied to the main heat exchanger 21 via the natural gas introduction pipe 20, then cooled by the first refrigerant, and purified into a liquefied natural gas.

Meanwhile, the absorbing liquid that has absorbed the acid gases is introduced into the heat exchanger 94 via the pipe 81 and heated. After being heated in the heat exchanger 94, the absorbing liquid is reduced in pressure by the expansion valve 95 and guided into the intermediate tank 91. The absorbing liquid that has been guided into the intermediate tank 91 releases a portion of the carbon dioxide contained in the liquid. A remainder of the carbon dioxide is stored as a liquid in the lower section of the intermediate tank 91. The carbon dioxide released from the intermediate tank 91 is supplied to the gas turbine equipment 72 via the low-temperature heat source supply system 85. Part of the carbon dioxide in the low-temperature heat source supply system 85 is supplied to the gas treatment apparatus 97 via the pipe 82 and treated properly.

The absorbing liquid stored within the lower section of the intermediate tank 91 circulates through the pipe 88 and is reduced in pressure again by the expansion valve 96. After being depressurized in the expansion valve 96, the absorbing liquid is introduced into the regeneration tower 92 and releases the remaining acid gases contained in the liquid. The released acid gases are supplied to the gas treatment apparatus 97 via the pipes 83, 82. The absorbing liquid that has been regenerated by the separation of the acid gases is pressurized by the pump 99 and supplied to the heat exchanger 94. The absorbing liquid thus supplied to the heat exchanger 94 is cooled by the absorbing liquid flow from the absorption tower 90, then supplied thereto, and reused to absorb acid gases.

Carbon dioxide that has been introduced from the intermediate tank 91 into the low-temperature heat source supply system 85 is controlled at the flow control valve 79 to a quantity suitable for cooling the gas turbine equipment 72, and supplied to the pipes 85a, 85b. The carbon dioxide, after being supplied to the pipe 85a, is further supplied to the turbine 76 to cool the high-temperature parts thereof (e.g., the turbine rotor blades and the turbine stator vanes) throughout the rated load operation of the gas turbine equipment 72. This suppresses temperature rises of the turbine high-temperature parts, thus suppressing temperature rises of the turbine high-temperature metallic parts to stay within respective design tolerances. Also, the carbon dioxide that has been supplied to the pipe 85b is further supplied to the combustor 75 to cool the high-temperature parts thereof (e.g., the combustor liner). This also suppresses temperature rises of the combustor high-temperature parts throughout the rated load operation of the gas turbine equipment 72.

Next, advantageous effects of the natural gas liquefaction plant according to the first embodiment of the present invention are described below in some connection with a situation to which the motive power supply equipment of the natural gas liquefaction plant is likely to be exposed.

In general gas turbine equipment, part of the compressed air which serves as a working fluid is commonly used to cool the turbine blades/vanes, combustors, and other high-temperature parts exposed to high temperatures. For use of the gas turbine equipment as the motive power supply equipment of a natural gas liquefaction plant, as in the present embodiment, since the localities of natural gas are usually situated in the Middle East, Southeast Asia, and other areas of high air temperatures, the temperature conditions to which the high-temperature parts are exposed tend to become severe, compared with those of the high-temperature parts in the gas turbine equipment provided in other areas. For this reason, temperature rises of the high-temperature parts easily occur in comparison with use as the motive power generators of other plants. In the meantime, natural gas liquefaction plants require a successive and stable supply of motive power for maintained quality of the natural gas and its increased production, so the gas turbine equipment that is the source of the power is required to be highly reliable, compared with other plants.

One conceivable measure to strengthen the cooling of the high-temperature parts would be by increasing the flow rate of cooling air. Increasing the flow rate of the cooling air for such a purpose, however, has posed the problems of combustion air being correspondingly reduced, the output and efficiency of the gas turbine equipment thus being reduced, and costs of the gas turbine equipment being increased.

In provision against such a situation, the natural gas liquefaction plant according to the first embodiment includes the low-temperature heat source supply system 85 which, during the rated load operation of the gas turbine equipment 72, supplies carbon dioxide as a cooling medium to the gas turbine equipment 72 in order to cool the gas turbine equipment 72, the carbon dioxide being generated by separation from the natural gas in the natural gas purification equipment 70. According to the low-temperature heat source supply system 85 thus provided, since the high-temperature parts of the gas turbine equipment 72 can be cooled using a large quantity of carbon dioxide occurring in the natural gas purification equipment 70, temperature rises of the high-temperature metallic parts can be easily suppressed to stay within the respective design tolerances. This, in turn, reduces the amount of compressed air used as a cooling medium for the high-temperature parts, and hence improves the reliability of the gas turbine equipment 72 without reducing the output and efficiency thereof. In addition, since reductions in the output and efficiency of the gas turbine equipment 72 can be suppressed, power-generating costs can be lowered and the quantity of carbon dioxide generation based upon fuel usage can be suppressed.

At the natural gas liquefaction plants constructed particularly in the Middle East, Southeast Asia, and other areas of high air temperatures, the high-temperature parts of the gas turbine equipment tend to be exposed to a severe temperature environment. However, if, as in the present embodiment, the high-temperature parts are cooled using carbon dioxide, since the carbon dioxide that the natural gas purification equipment 70 separates does not become too susceptible to air temperature and additionally since the carbon dioxide can be used in such large quantities as to make its flow rate freely controllable, using this cooling method, compared with using compressed air, allows effective cooling of the motive power supply equipment for the natural gas liquefaction plant.

Additionally in the present embodiment, when the carbon dioxide supplied to the combustor 75 via the pipe 85b is used to cool the combustor liner, the air conventionally used for liner cooling can be used as combustion air, so the combustion air can be increased. This, in turn, allows reduction of the nitrogen oxides (NOx) discharged from the gas turbine equipment 72, and hence, environmental protection of the plant periphery. These further allow reduction of costs required for a denitration apparatus.

Furthermore, while a pressure of the carbon dioxide needs to be increased above at least an internal pressure of the gas turbine equipment to implement so-called open-circuit cooling, controlling the expansion valves 95 and 96 in opening angle makes a pressure of the intermediate tank 91 adjustable to a level suitable for supply to the gas turbine equipment 72. Carbon dioxide can therefore be supplied to the high-temperature parts without providing a pump or any other separate compression power sources midway in the low-temperature heat source supply system 85.

Moreover, carbon dioxide, because of its great specific heat relative to that of air, is excellent in cooling capability and small in internal temperature changes of the cooling circulation passageway, for which reason, using carbon dioxide allows more effective cooling of the high-temperature parts than using air as a cooling medium.

Next, a second embodiment of the present invention will be described.

The present embodiment differs from the first embodiment in that an intermediate tank 91A undergoes internal temperature control.

Figure 3:
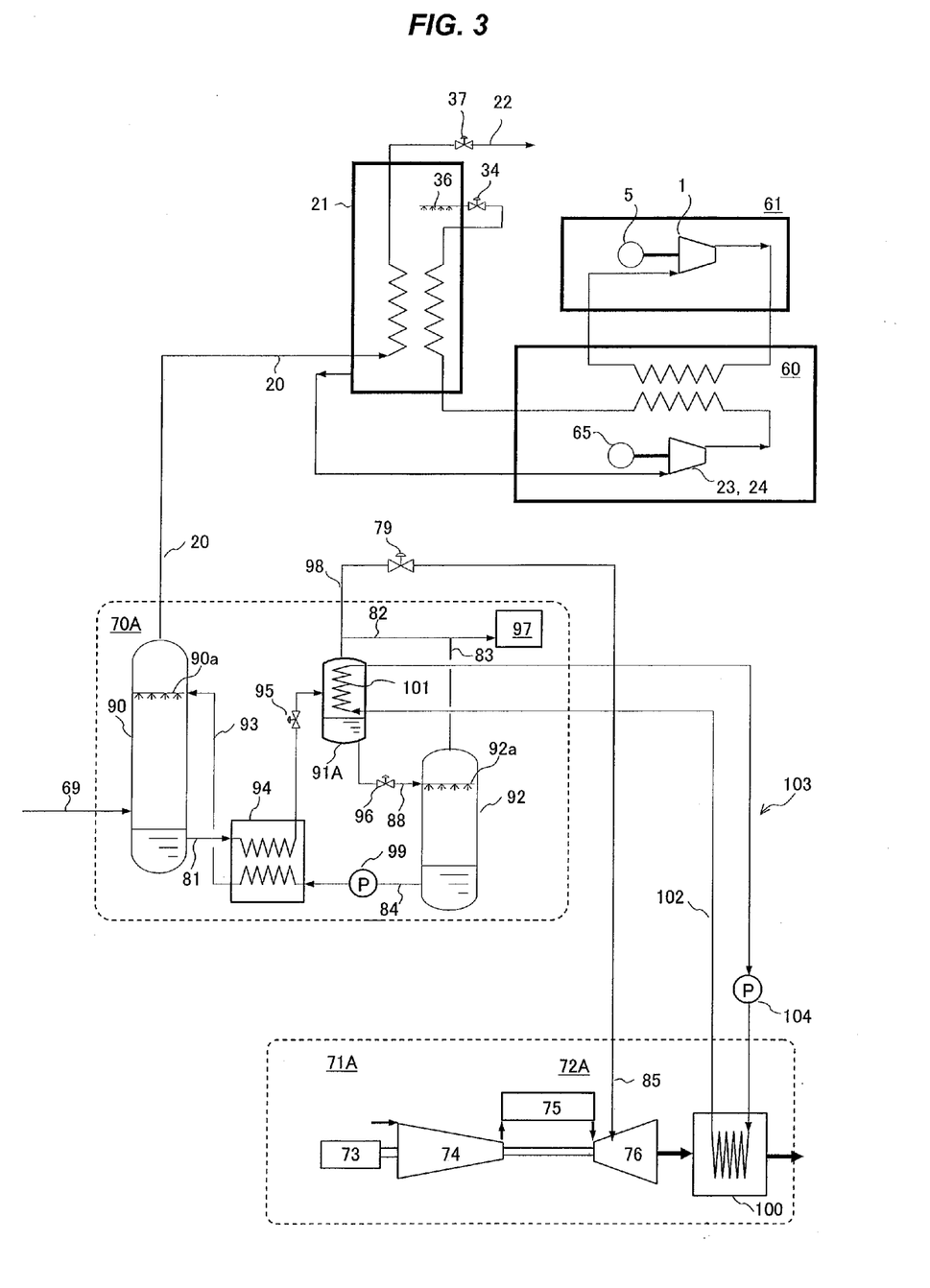
FIG. 3 is a schematic diagram of a natural gas liquefaction plant according to a second embodiment of the present invention.

FIG. 3 is a schematic diagram of a natural gas liquefaction plant according to the second embodiment of the present invention.

The natural gas liquefaction plant shown in FIG. 3 includes natural gas purification equipment 70A, motive power supply equipment 71A, and high-temperature heat source supply system 103.

The high-temperature heat source supply system 103 for cyclic supply of a heat medium from an exhaust heat recovery boiler 100 to the natural gas purification equipment 70A includes the exhaust heat recovery boiler 100, a pipe 102, a heat transfer tube 101, and a pump 104.

The exhaust heat recovery boiler 100 is provided downstream in a circulating direction of exhaust gases from the gas turbine equipment 72, and uses the exhaust gases to heat the heat medium (in the present embodiment, steam) in the pipe 102.

The pipe 102 for connecting the exhaust heat recovery boiler 100 and the heat transfer tube 101 is constructed annularly for the heated heat medium to be cyclically supplied to the heat transfer tube 101. Also, the pump 104 for boosting the heat medium is connected to the pipe 102. The pump 104 regulates an internal temperature of the intermediate tank 91A.

The heat transfer tube 101 for increasing the internal temperature of the intermediate tank 91A is provided in the intermediate tank 91A. The heat transfer tube 101 heats an absorbing liquid present inside the intermediate tank 91A, by utilizing the heat medium that the exhaust heat recovery boiler 100 has heated.

According to the natural gas liquefaction plant constructed as described above, the internal temperature of the intermediate tank 91 can be controlled with the high-temperature heat source supply system 103, so temperature as well as pressure of the intermediate tank 91A becomes controllable. Thus, the amount and pressure of carbon dioxide occurring in the intermediate tank 91A can be controlled more precisely. If the carbon dioxide separated in the intermediate tank 91A is thus precisely controllable in characteristics, flexibility of cooling of the gas turbine equipment 72 increases, which in turn facilitates temperature management of the high-temperature parts and further improves the gas turbine equipment 72 in reliability and longevity. In the present embodiment, in particular, since the exhaust gases from the gas turbine equipment 72 are used as a heat source to heat the intermediate tank 91A, energy saving in and efficiency enhancement of the entire plant can be achieved in addition to the above advantageous effects.

Additionally in the present embodiment, flows of acid gases other than carbon dioxide into the low-temperature heat source supply system 85 and into the gas turbine equipment 72 can be suppressed by adjusting the pressure and temperature of the intermediate tank 91A for suppressed separation of these acid gases (other than carbon dioxide) in the intermediate tank 91A. If these flows of other acid gases into the low-temperature heat source supply system 85 and into the gas turbine equipment 72 are suppressed, corrosion of these plant components due to presence of acid gases therein can be suppressed.

An arrangement for using the exhaust heat recovery boiler 100 as a heating source for the heat medium for heating the intermediate tank 91A has been described above. However, a temperature controller may be constructed to control the internal temperature of the intermediate tank 91A by using a heating apparatus or method such as a separate boiler, heat conduction heater, or heating with other heat media, instead of using the exhaust heat recovery boiler 100. Alternatively, the heat medium after being heated by the exhaust heat recovery boiler 100 may be used as a heat source for any other heating device (e.g., the heat exchanger 94) provided in the natural gas purification equipment 70.

Next, a third embodiment of the present invention will be described.

The present embodiment differs from the first embodiment in that carbon dioxide is recovered after being used for cooling the gas turbine equipment 72.

Figure 4:
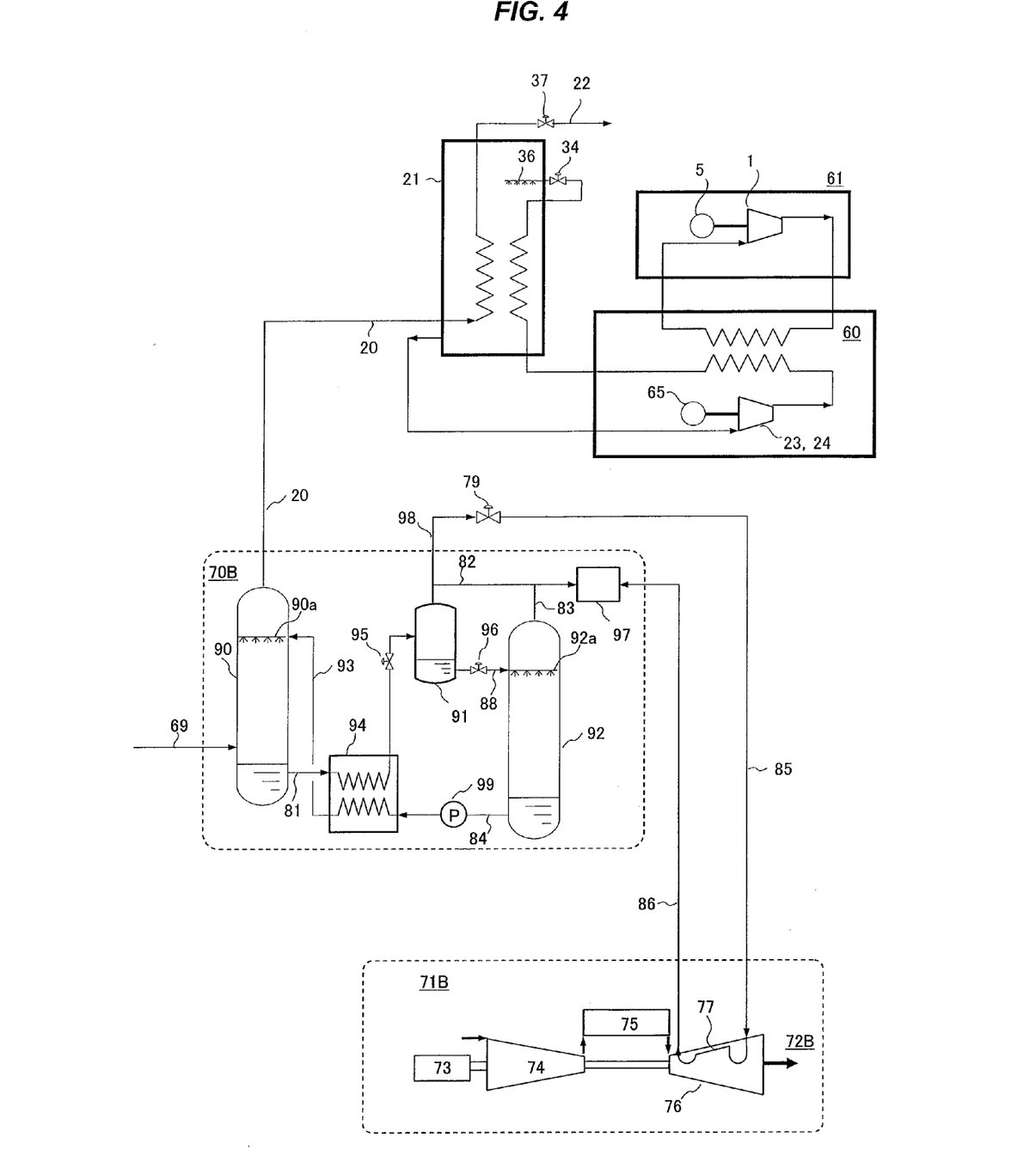
FIG. 4 is a schematic diagram of a natural gas liquefaction plant according to a third embodiment of the present invention.

FIG. 4 is a schematic diagram of a natural gas liquefaction plant according to the third embodiment of the present invention.

The natural gas liquefaction plant shown in FIG. 4 includes natural gas purification equipment 70B, motive power supply equipment 71B, and low-temperature heat source recovery system 86.

The low-temperature heat source recovery system 86 used for returning to natural gas purification equipment 70B the carbon dioxide which has been used to cool the gas turbine equipment 72B connects the gas treatment apparatus 97 and the gas turbine equipment 72B.

The gas turbine equipment 72B has a low-temperature heat source circulation passageway 77. The low-temperature heat source circulation passageway 77 for circulation of the carbon dioxide supplied from the low-temperature heat source supply system 85 is provided between the low-temperature heat source supply system 85 and the low-temperature heat source recovery system 86. The low-temperature heat source circulation passageway 77 is a special circulation passageway for the carbon dioxide, provided independently of a circulation passageway for compressed air, and the passageway 77 is used for closed-circuit cooling of the high-temperature parts in the gas turbine equipment 72. The low-temperature heat source circulation passageway 77 may be provided on the surfaces of the high-temperature parts or inside these parts or may be provided as a passageway shrouding the high-temperature parts from the outside. The low-temperature heat source circulation passageway 77, although provided in the turbine 76 in FIG. 4, may be provided so as to encircle other high-temperature parts such as the combustor 75.

In the natural gas liquefaction plant constructed as described above, carbon dioxide that has been supplied to the gas turbine equipment 72 via the low-temperature heat source supply system 85 cools the high-temperature parts of the gas turbine equipment 72 during passage through the low-temperature heat source circulation passageway 77, and then the carbon dioxide is introduced into the low-temperature heat source recovery system 86. After being introduced into the low-temperature heat source recovery system 86, the carbon dioxide is further introduced into the gas treatment apparatus 97 and then treated together with the carbon dioxide discharged from the intermediate tank 91, and other acid gases discharged from the regeneration tower 92.

If the carbon dioxide that was thus used to cool the gas turbine equipment 72 is treated properly with the gas treatment apparatus 97, carbon dioxide emission from the natural gas liquefaction plant can be prevented, which helps prevent global warming. The method of treatment by the gas treatment apparatus 97 in this case includes, for example, compressing/solidifying acid gases. Release of the carbon dioxide to the atmosphere can be prevented if the acid gases that have been compressed/solidified by the gas treatment apparatus 97 in that case are stored into the ground, the sea, or the like.

In addition, when closed-circuit cooling is adopted for the gas turbine equipment 72B as discussed above, the pressure of the carbon dioxide flowing into the gas treatment apparatus 97 via the low-temperature heat source recovery system 86 decreases below the pressure of the regeneration tower 92. Therefore, the pressure of the carbon dioxide supplied to the gas turbine equipment 72B (i.e., the pressure of the intermediate tank 91) can be reduced more significantly than by adoption of open-circuit cooling. Thus, compared with the first embodiment, the present embodiment extends a pressure-setting design range for the intermediate tank 91, hence making the plant easier to design.

Furthermore, according to the present embodiment, the gas turbine equipment 72B can be cooled using carbon dioxide of a pressure exceeding an internal pressure of the regeneration tower 92, and the intermediate tank 91 can therefore be omitted. Omitting the intermediate tank 91 in this manner makes simplification and cost reduction of the natural gas purification equipment 70B achievable.

While embodiments that employ a so-called simple-cycle gas turbine as gas turbine equipment have been described above, advantageous effects substantially equivalent to those of the embodiments can likewise be obtained by using a combined-cycle gas turbine made up of a combination of gas turbine equipment and steam turbine equipment.

The invention claimed is:

1. Motive power supply equipment for a natural gas liquefaction plant, adapted to supply motive power to the natural gas liquefaction plant for liquefying a natural gas from which impurities have been separated in natural gas purification equipment, the motive power supply equipment comprising:

gas turbine equipment including a compressor for compressing air, a combustor for generating combustion gases by burning a fuel and the compressed air from the compressor, and a turbine rotated by the combustion gases from the combustor;

a passageway for carbon dioxide separate from a circulation passage for compressed air, the passageway provided on a high-temperature component part in the gas turbine equipment; and a low-temperature heat source supply system which, during rated load operation of the gas turbine equipment, supplies carbon dioxide to the passageway as a cooling medium which cools the gas turbine equipment by heat exchange with the high-temperature component part, the carbon dioxide being generated by separation from the natural gas in the natural gas purification equipment; and a low-temperature heat source recovery system which circulates the carbon dioxide that has cooled the gas turbine equipment via the passageway into the natural gas purification equipment.

2. The motive power supply equipment according to claim 1, wherein:

the turbine is the high temperature part subjected to cooling which uses the carbon dioxide supplied from the low-temperature heat source supply system.

3. The motive power supply equipment according to claim 1, wherein:

the combustor is the high temperature part subjected to cooling which uses the carbon dioxide supplied from the low-temperature heat source supply system.

4. The motive power supply equipment according to claim 1, further comprising:

an exhaust heat recovery boiler for heating a heat medium by using exhaust gases released from the gas turbine equipment; and a high-temperature heat source supply system for cyclically supplying to the natural gas purification equipment the heat medium sent from the exhaust heat recovery boiler.

5. The motive power supply equipment according to claim 1, wherein:

the gas turbine equipment is connected to an electric power generator that supplies electric power to the natural gas liquefaction plant.

6. A natural gas liquefaction plant, comprising:

natural gas purification equipment for separating impurities from a mined natural gas;

a main heat exchanger using a first refrigerant to cool the natural gas obtained from the natural gas purification equipment;

a first refrigeration cycle system for compressing and cooling the first refrigerant for supply to the main heat exchanger;

a second refrigeration cycle system for compressing and cooling a second refrigerant for cooling the first refrigerant, the second refrigerant being used for cooling the first refrigerant supplied from the first refrigeration cycle system;

gas turbine equipment for supplying motive power to the first refrigeration cycle system and the second refrigeration cycle system;

a passageway for carbon dioxide separate from a circulation passage for compressed air, the passageway provided on a high-temperature component part in the gas turbine equipment; and a low-temperature heat source supply system which, during rated load operation of the gas turbine equipment, supplies carbon dioxide to the passageway as a cooling medium which cools the gas turbine equipment by heat exchange with the high-temperature component part, the carbon dioxide being generated by separation from the natural gas in the natural gas purification equipment; and a low-temperature heat source recovery system which circulates the carbon dioxide that has cooled the gas turbine equipment via the passageway into the natural gas purification equipment.

7. The natural gas liquefaction plant according to claim 6, wherein the natural gas purification equipment includes:

an absorption tower using an absorbing liquid to absorb, from the mined natural gas, an acid gas laden with carbon dioxide;

an intermediate tank for separating the carbon dioxide by reducing a pressure of the absorbing liquid supplied from the absorption tower; and a regeneration tower for separating the acid gas by reducing the pressure of the absorbing liquid supplied from the intermediate tank.

8. The natural gas liquefaction plant according to claim 7, wherein:

the intermediate tank includes a temperature control device that controls an internal temperature of the intermediate tank.

9. The natural gas liquefaction plant according to claim 8, wherein:

a heat source for the temperature control device is an exhaust heat recovery boiler that uses exhaust gases of the gas turbine equipment as a heat source for the temperature control device.

* * * * *